United States Patent
Corrodi et al.

(10) Patent No.: US 12,026,656 B2
(45) Date of Patent: Jul. 2, 2024

(54) SYSTEM AND PROCESS FOR PAIRING COMMERCIAL SHIPPING ASSETS WITHIN A DYNAMIC INFORMATION DISCOVERY PROTOCOL

(71) Applicant: Stoneridge Electronics AB, Solna (SE)

(72) Inventors: Brad Corrodi, Princeton, NJ (US); Milan Gavrilovic, Uppsala (SE)

(73) Assignee: Stoneridge Electronics AB, Solna (SE)

( * ) Notice: Subject to any disclaimer, the term of this patent is extended or adjusted under 35 U.S.C. 154(b) by 508 days.

(21) Appl. No.: 17/320,274

(22) Filed: May 14, 2021

(65) Prior Publication Data
US 2022/0253964 A1    Aug. 11, 2022

Related U.S. Application Data (60) Provisional application No. 63/147,819, filed on Feb. 10, 2021.

(51) Int. Cl.
| | |
|---|---|
| *G06Q 10/08* | (2024.01) |
| *G05B 15/02* | (2006.01) |
| *G06K 7/14* | (2006.01) |
| *G06Q 10/0631* | (2023.01) |
| *G06V 20/56* | (2022.01) |

(52) U.S. Cl.
CPC ............ *G06Q 10/08* (2013.01); *G05B 15/02* (2013.01); *G06K 7/1413* (2013.01); *G06K 7/1417* (2013.01); *G06Q 10/0631* (2013.01); *G06V 20/56* (2022.01)

(58) Field of Classification Search
CPC .... G06Q 50/28; G06Q 10/0631; G05B 15/02; G06K 7/1413; G06K 7/1417; G06V 20/56

USPC ......................................................... 340/431
See application file for complete search history.

(56) References Cited

U.S. PATENT DOCUMENTS

| | | | | |
|---|---|---|---|---|
| 4,430,637 | A | * | 2/1984 | Koch-Ducker ........ B60Q 11/00 340/687 |
| 5,247,442 | A | | 9/1993 | Kendall |
| 6,142,372 | A | * | 11/2000 | Wright .................. G08G 1/017 902/4 |
| 7,040,435 | B1 | * | 5/2006 | Lesesky ................ G08G 1/017 180/167 |
| 10,299,129 | B2 | * | 5/2019 | Dieckmann ............. H04L 67/12 |
| 10,486,596 | B2 | | 11/2019 | Rathi et al. |

(Continued)

FOREIGN PATENT DOCUMENTS

| | | |
|---|---|---|
| DE | 102006035021 | 1/2008 |
| WO | 2018166602 A1 | 9/2018 |

OTHER PUBLICATIONS

International Search Report and Written Opinion for International Patent Application No. PCT/US2021/032361 completed on Sep. 15, 2021.

(Continued)

*Primary Examiner* — Zhen Y Wu
(74) *Attorney, Agent, or Firm* — Carlson, Gaskey & Olds, P.C.

(57) ABSTRACT

A method for pairing commercial shipping assets includes identifying the presence of a second asset using a sensor system of a first asset, retrieving a master asset identifier of the second asset using a controller of the first asset, physically connecting the first asset and the second asset, and updating a dynamic information discovery protocol environment.

10 Claims, 5 Drawing Sheets

(56) References Cited

U.S. PATENT DOCUMENTS

| | | | |
|---|---|---|---|
| 10,841,127 B1* | 11/2020 | Greer | B60T 17/221 |
| 10,878,305 B1* | 12/2020 | Ziegler | H04W 84/12 |
| 2003/0233189 A1* | 12/2003 | Hsiao | G01C 21/26 |
| | | | 340/988 |
| 2006/0261935 A1* | 11/2006 | McAden | B60R 25/00 |
| | | | 340/431 |
| 2008/0143593 A1* | 6/2008 | Graziano | G06Q 10/08 |
| | | | 342/357.46 |
| 2014/0081543 A1* | 3/2014 | Fry | B60T 8/17 |
| | | | 701/70 |
| 2014/0117076 A1* | 5/2014 | Eberlein | G06F 16/9566 |
| | | | 235/375 |
| 2014/0179228 A1* | 6/2014 | Maffetone | H04B 7/00 |
| | | | 455/41.2 |
| 2015/0349977 A1* | 12/2015 | Risse | H04L 12/6418 |
| | | | 375/257 |
| 2016/0052548 A1* | 2/2016 | Singh | B62D 15/0265 |
| | | | 701/41 |
| 2016/0304054 A1* | 10/2016 | Mansuri | B60R 25/102 |
| 2018/0039266 A1* | 2/2018 | Dotzler | G05D 1/0022 |
| 2018/0096293 A1* | 4/2018 | Terwilliger | H04W 4/70 |
| 2018/0097884 A1* | 4/2018 | Terwilliger | H04L 67/52 |
| 2019/0143771 A1* | 5/2019 | Hall | G06K 19/06037 |
| | | | 340/431 |
| 2020/0012828 A1* | 1/2020 | Xu | G06K 7/10366 |
| 2022/0057797 A1* | 2/2022 | Ramsager | G06K 7/1413 |

OTHER PUBLICATIONS

Anonymous, Strick adds QR codes to trailer VIN tags, Aug. 2, 2018 (Aug. 2, 2018), pp. 1-1, XP055841099, Retrieved from the Internet: URL:https://www.trailer-bodybuilders.com/trailers/article/21743172/strick-adds-qr-codes-to-trailer-vin-tags, [retrieved on Sep. 14, 2021], the whole document.

International Preliminary Report on Patentability for International Patent Application No. PCT/US2021/032361 completed on Aug. 24, 2023.

\* cited by examiner

SYSTEM AND PROCESS FOR PAIRING COMMERCIAL SHIPPING ASSETS WITHIN A DYNAMIC INFORMATION DISCOVERY PROTOCOL

CROSS-REFERENCE TO RELATED APPLICATION

This application claims priority to U.S. Patent Application No. 63/147,819 filed on Feb. 10, 2021.

TECHNICAL FIELD

The present disclosure relates generally to pairing assets within a commercial shipping ecosystem including a dynamic information discovery protocol.

BACKGROUND

Commercial shipping and transportation systems utilize multiple distributed assets to facilitate the movement of goods, or other shipments, from one location to another location. Multiple components work together to allow this movement, including tractors, trailers, cargo containers, cargo chassis, loading and unloading docks, etc. The disparate components are collectively referred to as assets. The grouping of all the assets working cooperatively to transport shipments is referred to as the ecosystem. Within the ecosystem some, or all, of the assets include sensor systems such as video cameras, radar systems, and the like. The sensor systems on any given asset are utilized to facilitate operations of that asset.

Certain assets within a given ecosystem operate together during at least a portion of their operations. By way of example, a tractor asset will operate in conjunction with a paired trailer asset. Similarly, a container chassis asset will operate in conjunction with a paired container asset for at least a portion of their operations.

With the advent of higher technology systems within a commercial shipping ecosystem, the procedure for pairing a first asset with a second asset so that they can operate as a single asset (e.g. a tractor/trailer or a container/chassis combination) has increased in complexity. The complexity increase is particularly noticeable in cases where the pairing of assets involve a physical connection of the assets (e.g. hooking a trailer to a tractor) and is not simply an association of assets within the environment. Further, when one asset can be paired with multiple different second assets or distinct configurations of a single second asset type, reliance on only the sensor information provided from the first asset in making the pairing can be difficult.

SUMMARY OF THE INVENTION

An exemplary method for pairing commercial shipping assets includes identifying the presence of a second asset using a sensor system of a first asset, retrieving a master asset identifier of the second asset using a controller of the first asset, physically connecting the first asset and the second asset, and updating a dynamic information discovery protocol environment.

In another example of the above described method for pairing commercial shipping assets identifying the presence of the second asset includes detecting an optically-readable encoded asset identifier using the sensor system of the first asset.

In another example of any of the above described methods for pairing commercial shipping assets the optically readable encoded asset identifier includes an encoded universal resource locator identifying a location where a master asset identifier of the second asset can be retrieved.

In another example of any of the above described methods for pairing commercial shipping assets retrieving the master asset identifier includes accessing the encoded universal resource locator and downloading the master asset identifier of the second asset.

In another example of any of the above described methods for pairing commercial shipping assets the optically readable encoded asset identifier includes at least one of horizontal ranging bars and vertical ranging bars.

In another example of any of the above described methods for pairing commercial shipping assets the optically readable encoded asset identifier includes both horizontal ranging bars and vertical ranging bars.

In another example of any of the above described methods for pairing commercial shipping assets physically connecting the first asset and the second asset includes receiving a feed from at least one sensor of the second asset at a controller of the first asset and responding to the feed from the at least one sensor of the second asset.

In another example of any of the above described methods for pairing commercial shipping assets responding to the feed from the at least one sensor of the second asset comprises automatically adjusting a docking assist operation performed by the controller of the first asset.

In another example of any of the above described methods for pairing commercial shipping assets respond to the feed from the at least one sensor of the second asset comprises providing a notification to an operator of the first asset.

In another example of any of the above described methods for pairing commercial shipping assets updating the dynamic information discovery protocol environment comprises associating the first asset and the second asset in the dynamic information discovery protocol such that the first asset and the second asset are defined as a single asset.

In another example of any of the above described methods for pairing commercial shipping assets the first asset is a commercial tractor and wherein the second asset is a trailer.

In another example of any of the above described methods for pairing commercial shipping assets updating the dynamic information discovery protocol environment includes identifying a time of a pairing, identifying a date of a pairing, identifying an operator who performed the pairing, and identifying a location where the pairing operation occurred.

In one exemplary embodiment a commercial shipping asset includes a connection configured to pair the commercial shipping asset with at least one other commercial shipping asset, a controller including at least one of an automated or semi-automated pairing assist system and configured to access a dynamic information discovery protocol environment, a plurality of sensors disposed about the commercial shipping asset, and the controller being configured to identifying the presence of a second asset using at least one sensor of the plurality of sensors, retrieving a master asset identifier of the second asset and updating a dynamic information discovery protocol environment.

In another example of the above described commercial shipping asset the plurality of sensors includes a rear facing camera, and wherein the rear facing camera is connected to the controller such that an image feed of the rear facing camera is provided to the controller.

In another example of any of the above described commercial shipping assets the commercial shipping asset is an intelligent asset in the dynamic information discovery protocol.

In another example of any of the above described commercial shipping assets updating the dynamic information discovery protocol comprises identifying the at least one other commercial shipping asset and instructing the dynamic information discovery protocol to treat the commercial shipping asset and the at least one other commercial shipping asset as a single asset.

In another example of any of the above described commercial shipping assets the commercial shipping asset comprises a tractor and the at least one other commercial shipping asset includes a trailer.

In another example of any of the above described commercial shipping assets the at least one other commercial shipping asset includes a passive asset within the dynamic information discovery protocol, the passive asset including a plaque with an optically-readable encoded asset identifier encoding a universal resource locator address of a master asset identifier of the passive asset.

In another example of any of the above described commercial shipping assets the plaque further includes at least one of horizontal ranging bars and vertical ranging bars.

In another example of any of the above described commercial shipping assets the at least one other commercial shipping asset includes an intelligent asset within the dynamic information discovery protocol, the intelligent asset including at least one sensor feed and the at least one sensor feed is shareable via the dynamic information discovery protocol.

These and other features of the present invention can be best understood from the following specification and drawings, the following of which is a brief description.

DETAILED DESCRIPTION

Figure 1:
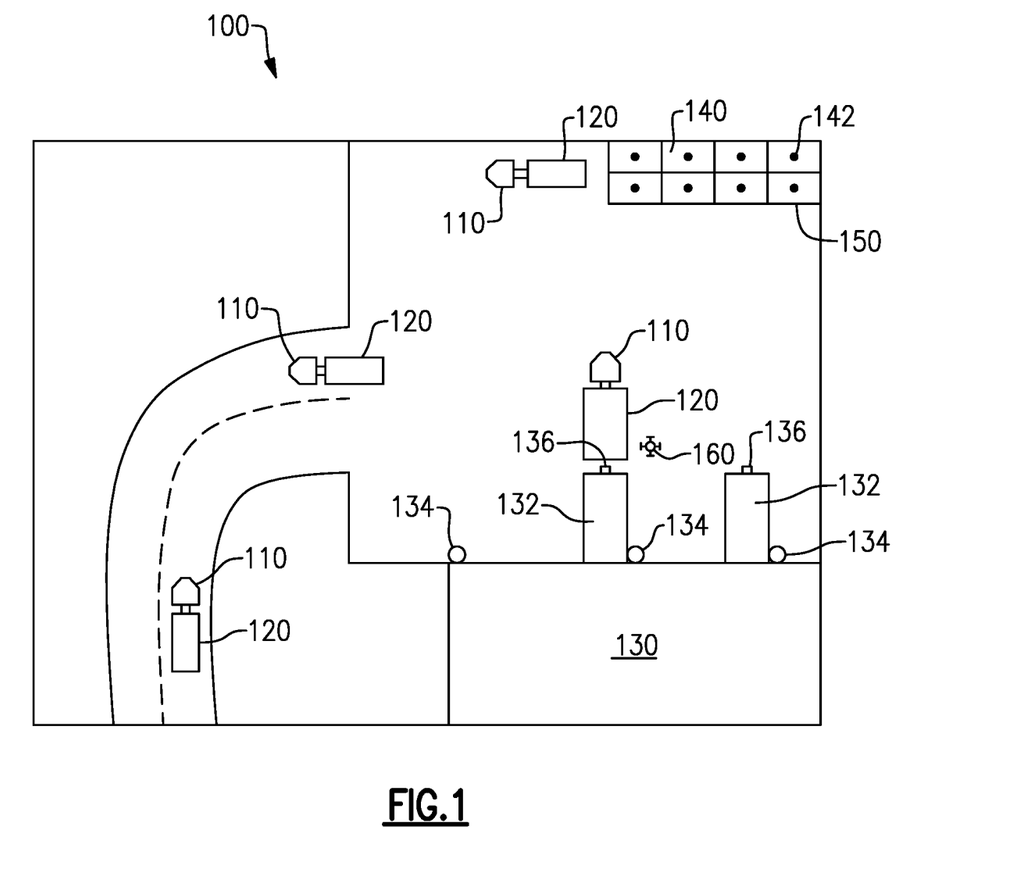
FIG. 1 illustrates an exemplary commercial shipping ecosystem.

FIG. 1 schematically illustrates an exemplary commercial shipping ecosystem 100 according to a first example. The exemplary ecosystem 100 is a warehouse shipping and receiving lot. In alternative examples, the ecosystem 100 can include a highway with multiple trucks, a railyard, a shipyard, an airport, or any similar environment. The commercial shipping ecosystem 100 includes multiple assets, such as tractors 110, trailers 120, a building 130 including loading docks 132, containers 140, and chassis 150 supporting the containers 140. In other ecosystems, additional or alternative assets can be included within the ecosystem.

Some, or all, of the assets 110, 120, 130, 140, 150 includes sensors such as video cameras 134, GPS monitors 142, and radar or lidar based proximity sensors 136. Each of the sensors is connected to a controller within the asset on which the sensor is mounted. The sensors then assist the asset performing some autonomous function or monitoring function. In some examples additional sensing systems, such as a drone 160, carrying a video camera can be deployed to supplement one or more of the asset sensors. In such examples, the drone 160 is considered to be part of the asset that deployed the drone 160.

Figure 2:
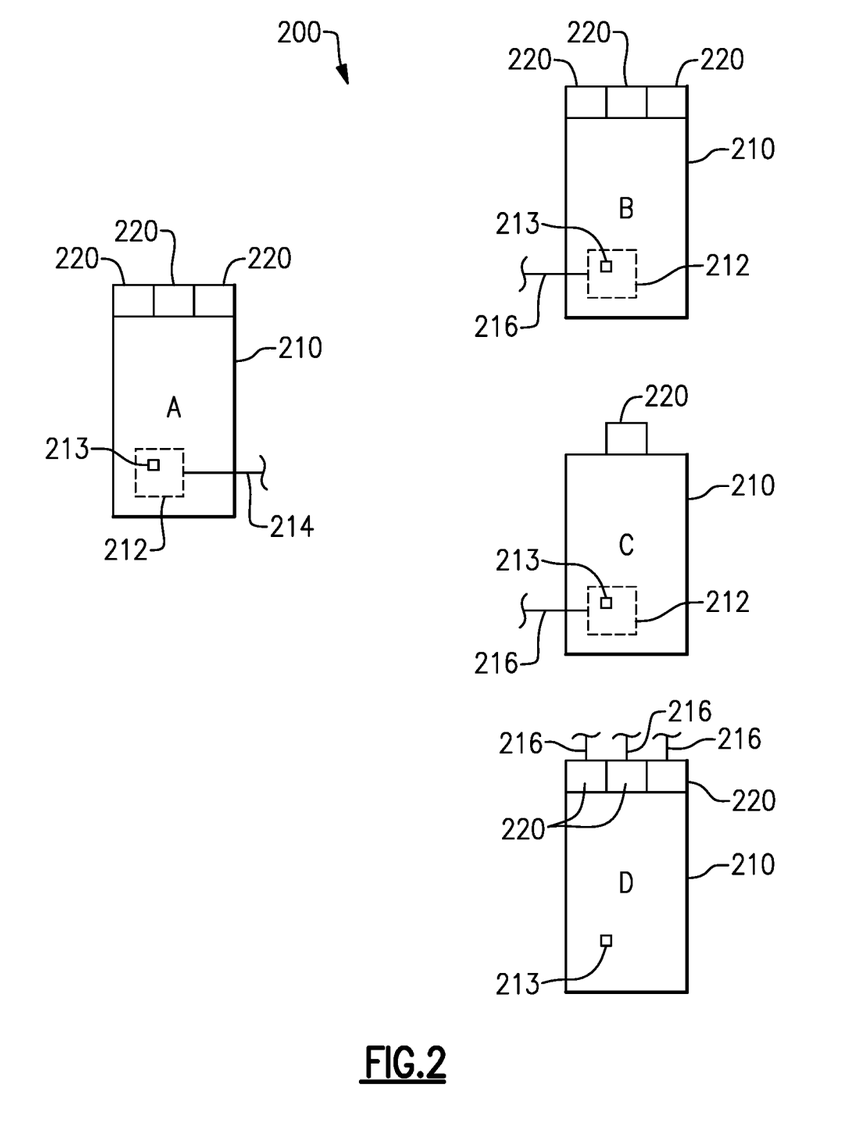
FIG. 2 schematically illustrates a highly schematic representation of an exemplary ecosystem including a dynamic information discovery protocol.

With continued reference to the ecosystem 100 of FIG. 1, FIG. 2 illustrates a highly schematic generic ecosystem 200 in which one or more assets 210 within the ecosystem 100 are able to utilize sensor information from another of the assets 210 within the ecosystem 100 via a dynamic information-discovery protocol.

The first asset 210 (A) includes a controller 212 with a receiver 214. Each asset 210 also includes one or more sensors 220. As described above, the sensors 220 can include proximity sensors, video cameras, or any other relevant sensor type. The receiver 214 is configured to receive data broadcast from the other assets 210, each of which includes a transmitter 216 from a controller 212 or a sensor 220 disposed on the asset 220. In one example, every asset 210 has a transmitter and a receiver.

In some examples, the assets 210 constantly transmit the data via the transmitters 216 and any other asset 210 is able to receive the transmitted data. In alternative examples the controllers 212 communicate with each other and establish authorization for the first asset 210 to utilize data provided by the second asset 210. In yet other examples, some assets 210 can continuously transmit data while others requires authorization.

To facilitate the communications and provision of data between assets, each of the controllers 212 includes a dynamic information discovery protocol that allows one intelligent asset 210 in the ecosystem to discern the presence of another asset 210 and query a range of sources to discern relevant information attributes of the other asset 210 in order to support a subsequent coordinated interaction with the other asset 210. Each controller 212, or asset 210 not including a controller 212, includes a master asset identifier 213. The master asset identifier 213 is a globally unique identifier assigned by the protocol to each asset 210 registered within the ecosystem 100. In some examples, the master asset identifier can be globally unique across multiple ecosystems. By way of example, vehicles or other assets that travel between ecosystems 100, 200 include master asset identifiers that are unique across all ecosystems in which the asset 210 is expected to operate.

In addition to uniquely identifying the asset 210, the master asset identifier 213 defines attributes of the asset 210. In one example, the master asset identifier 213 defines metadata of the asset 210 including a manifest of the data elements that the asset 210 has available, and from what source(s) the data in the asset is derived. The metadata can include both static and dynamic elements. The metadata further assists other assets 210 in identifying what sensor data to use from an asset and in determining how to use that data.

Figure 3:
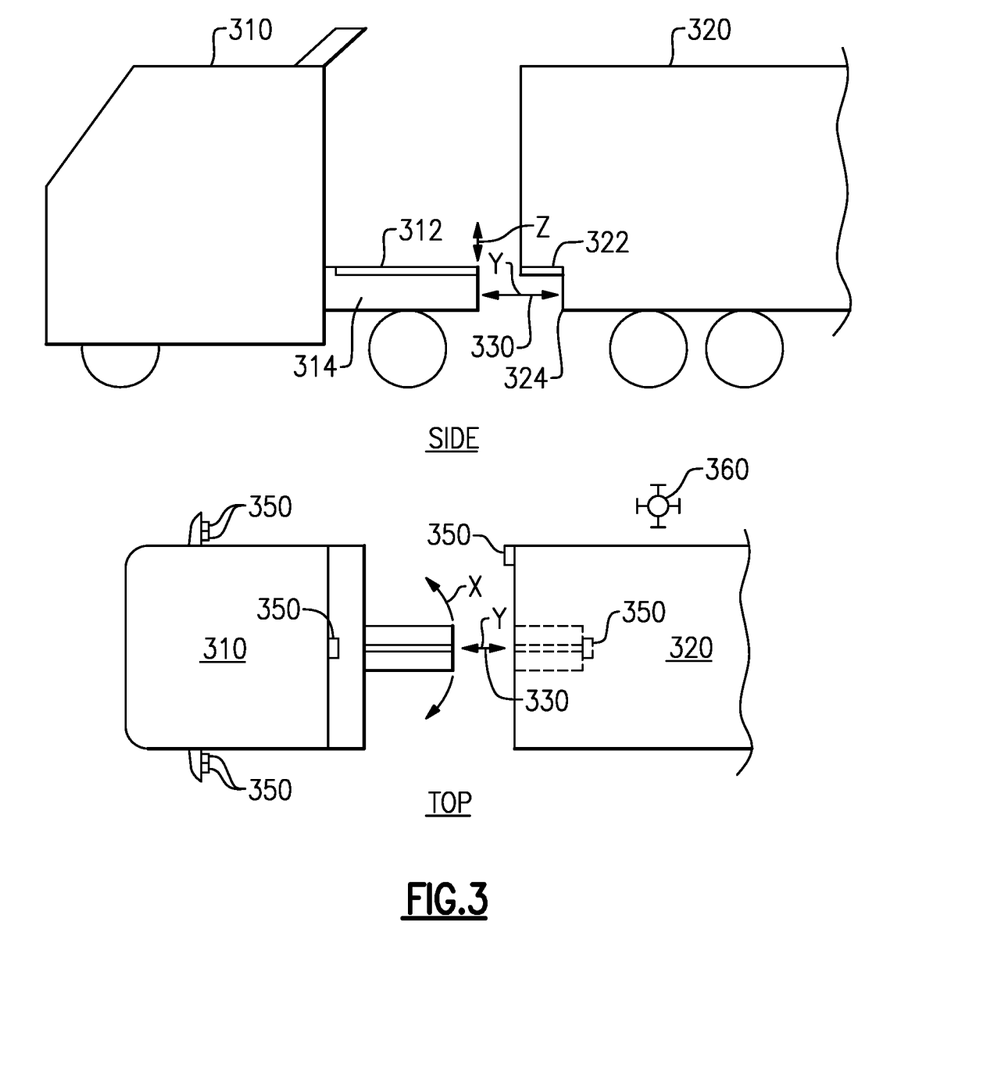
FIG. 3 schematically illustrates a hooking operation between a tractor and a trailer in a commercial shipping ecosystem.

With continued reference to the ecosystems 100, 200 of FIGS. 1 and 2 above, FIG. 3 schematically illustrates a highly simplified hooking operation between a tractor 310 and a trailer 320. The hooking operation is the process by which a tractor 310 pairs with a trailer 320, thereby allowing the tractor 310 to pull the trailer 320 and transport goods carried by the trailer 320 to a new location. Hooking is one example operation in which two assets within a dynamic information discovery protocol environment are paired.

In the hooking operations process, the driver is required to control five degrees of freedom between the assets being hooked together. Proper hooking requires that the tractor 310 be in the correct X, Z position such that a kingpin 322 of the trailer 320 is aligned with the engagement slot 312 in the fifth-wheel plate 314 of the tractor 310. In addition to the X, Z positioning, the steering of the tractor 310 must also be directed such that its rearward direction 330 of movement is aligned with the medial axis of the trailer 320, thereby ensuring that the kingpin 322 remains aligned as the tractor 310 moves along the x dimension. Even further still, the tractor 310 and the trailer 320 must also be within a narrow tolerance on the y axis, such that a lower leading edge 324 of the trailer 320 contacts the fifth wheel plate 314 at a height above its lower trailing edge 324, but below a height that would cause the bottom of the kingpin to be above locking jaws within the center recess of the plate 314. Once hooked, the tractor 310 and the trailer 320 are paired and can physically operate as a single asset in a commercial shipping environment 100, 200. In addition to the physically connection, completion of the hooking process updates the master asset identifier of each asset to identify that they are paired with each other as a single combined asset.

Each of the tractor 310 and the trailer 320 include multiple sensors 350 disposed about the corresponding structures. The sensors 350 can include video cameras, range detectors (radar, lidar, or any other sensing methodology), geospatial position detectors, and proximity detectors, as well as any number of other sensor types. In addition either the tractor 310 or the trailer 320 can include a drone 360 that can be deployed to provide additional sensor information.

As each of the tractor 310 and the trailer 320 include the dynamic information discovery protocol, the tractor 310 and the trailer 320 are able to connect and share relevant sensor data wirelessly, thereby allowing the tractor 310 to utilize video and range sensors 350, and any other relevant sensors, positioned on the trailer 320 to further assist in an automated or semi-automated hooking operation.

With continued reference to FIGS. 1-3, FIG. 4 schematically illustrates a tractor 410/trailer 420 configured to utilize the method for pairing a passive trailer 420 with an active-ranging tractor 410 for more safe and efficient "hook" operation. The pairing procedure utilizes a dynamic information discovery protocol that allows the tractor 410 to leverage data from the trailer 420, or from other commercial shipping assets in the vicinity of the trailer 420, to assist in performing the pairing procedure.

Figure 4:
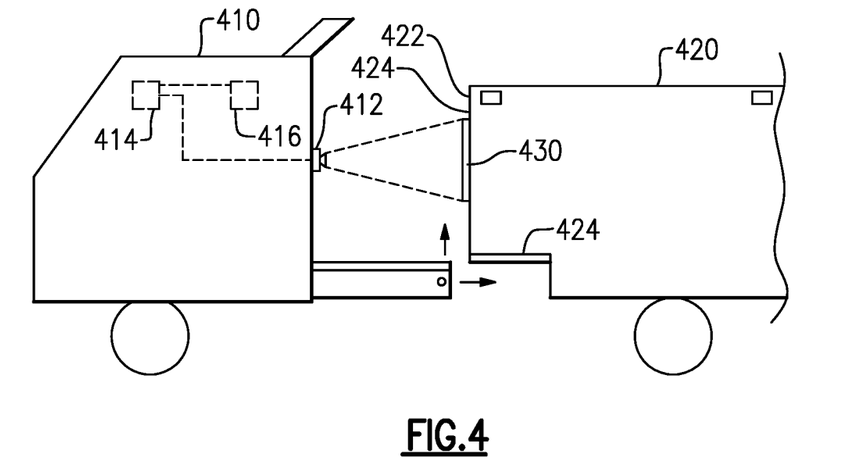
FIG. 4 schematically illustrates an example passive discovery pairing system for two assets in a dynamic information discovery protocol.

In the illustrated example, the trailer 420 is equipped with a printed plaque 430 placed on the front 422 of the trailer 420. The plaque 430 includes an optically-readable encoded asset identifier (the "ORAI", or colloquially, a QR-code) that includes data defining aspects of the trailer 420. The printed plaque 430 also includes at least two sets of additional optically-readable structured elements. The printed plaque 430 is one example of a passive asset identifier.

The first structured element is a set of horizontal "ranging bars" (HRB), with one or more encoding method to facilitate optical recognition, such as varying color/spectrum reflectivity, and varied thickness/spacing, a simple scheme might have a thick, shorter horizontal bar printed in the middle, with 5 progressively thinner/longer bars placed at increasing distance intervals, in a symmetrical pattern above and below the previous. The optical recognition of the horizontal ranging bars is configured in a manner that a camera, such as a rear mounted fifth wheel camera 412 of the trailer 410 can see the plaque 430 and interpret the horizontal ranging bars using a controller 414.

The second structured element is a set of vertical "ranging bars" (VRB) which are encoded similarly or differently from the horizontal bars described above, with the additional restriction that the center of the symmetrical vertical bar pattern is aligned with the center of the trailer 420 and its "kingpin" attachment point 424 along a medial axis of the trailer 420.

The tractor 410 is equipped with a rearward-facing "fifth wheel" camera (FWC) 412. The fifth wheel camera includes a fixed, calibrated orientation and positioning relative to the critical physical pairing characteristics of the tractor 410. The critical pairing characteristics include a y-axis height relative to the optimal level of a leading edge 424 of the trailer 420 for performing "hook" operations, the x-axis distance between the camera 412 and a central locking cavity of a fifth-wheel plate, the x-axis distance between the camera 412 and the closest safe point for the leading edge 424 of a trailer 420 relative to the back-wall of the trailer cab, and the z-axis offset of the camera 412 relative to the center medial axis-line of the tractor 410.

The tractor 410 is equipped with a video processing unit (VPU) 416 that is aware of the operating mode of the tractor 410 via either a connection to the controller 414 (in the illustrated example), or incorporation in the controller 414 (in alternative examples), such that when the trailer 410 initiates a hook operation (e.g., the tractor 410 does not have a trailer 420 currently attached, is within the macro-geofenced region of a distribution facility for an assigned hook operation, and has been placed into reverse gear) the VPU 416 begins actively scanning the data from the fifth wheel camera 412.

The VPU 416 recognizes the structure of the ORAI, and decodes the structure according to a reference dictionary supplied to all commercial assets registered within a given dynamic information discovery protocol ecosystem.

The primary data payload of all ORAIs registered within the dynamic information discovery protocol of a given ecosystem includes master asset identifier of the trailer 420, and a url for accessing a metadata manifest of the trailer 420. In alternative examples, the master asset identifier can be stored as a digital file transmitted from a controller onboard the trailer 420 or other asset. Thus the VPU 416 is configured to decode the ORAI according to a decoding procedure instructed by the dynamic information discovery protocol reference dictionary and extract the url for the metadata manifest of the trailer 420.

In one example, the VPU 416 may then query its own fleet operations management system with the master asset identifier of the trailer 420 and receive positive confirmation that the specific trailer 420 is the intended next asset to be paired with the tractor 410. The operations management system may, in one example, return a security token to the VPU 416 to enable the VPU 416 to obtain controlled/restricted information about the specific trailer 420 from the source url.

The VPU 416 then sends a message via a CAN messaging infrastructure of the tractor 410 to enable the human machine interface of the tractor 410, including a cockpit information display, secondary displays, and a CMS system, to provide a positive identification of the target trailer 420 to the driver of the tractor 410. The positive indication can be as simple as ignition of an indicator light on a cockpit display, or as complicated as a partial or full listing of the master asset identifier of the trailer 420 on a cockpit screen for the driver of the tractor 410.

The VPU 416 then obtains a metadata manifest for the master asset identifier of the specific trailer 420 by querying the associated url. Querying the url allows the VPU 416 to learn what passive physical hook pairing protocols the trailer 420 is configured to use. The url also provides data indicative of how to interpret the ranging lines (vertical and horizontal). By way of example, the URL can define what distance and margin of error in the vertical y-axis direction is the central horizontal ranging line from the leading edge of the trailer, what distance and margin of error in the vertical y-axis direction is the bottom of the kingpin 424 of the trailer 420, what distance and margin of error in the horizontal x-axis direction is the forward-most protrusion 424 of the trailer 420 from the plane of the ranging bars (e.g., does this trailer have a refrigeration unit that protrudes more forward than the plane of the ORAI mounted plaque, and what is that protrusion distance), what distance and margin of error in the horizontal x-axis direction is the kingpin 424 measured perpendicularly from the plane of the ORAI plaque 430, what is the centerline offset in the z-axis direction of the centermost VRB from the central axis of the trailer 420, as defined by the kingpin 424, what is the registered certificate identifier of the calibration authority that has taken responsibility for the accuracy of the physical calibration data for this specific master asset identifier.

The VPU 416 then attempts to discern the relative geospatial positioning of the tractor 410 and the trailer 420 by applying the appropriate ranging algorithm implemented for the specific passive optical ranging protocol identified by the master asset identifier and registered as part of the dynamic information discovery protocol.

After a predefined period of time, the VPU 416 transmits an additional alert to the vehicle human machine interface indicating whether the tractor 410 has locked onto the ranging indicators on the plaque 430 or not. By way of example, the human machine interface can utilize a Red or Green target icon, with a warning message that manual docking procedures are required if a lock cannot be established. In alternative examples, alternative visual, auditory, or visual and auditory indicators can be utilized to indicate whether the tractor 410 is locked on the plaque 430 or not.

Once a positive lock with the vertical ranging bars and horizontal ranging bars is established, the VPU 416 continues to transmit human machine interface messages to the operator throughout the hooking process. The messages reflect the progress and docking status, e.g., estimated distance, alignment (left/right, up/down distance relative to target), a traffic light indicator for operation within specified parameters (e.g., is speed slowing proportionally to distance, is tractor height relative to trailer within successful hooking margin, is L/R alignment within fifth-wheel engagement parameters), a "red light" condition would trigger an audible and visible alert to give the driver adequate time to avoid damage from a failed hooking maneuver.

Upon successful hooking engagement (i.e. successful completion of the hooking procedure), the VPU 416 (or another electronic control unit on the tractor 410) listen for a controller area network (CAN) message indicating positive closure of the locking-jaws within the fifth-wheel central mechanism. The positive closure message triggers a success message in the human machine interface and updates the operating state of both assets (the trailer 420 and the tractor 410) to the central dynamic information discovery database using an application programming interface (API). By way of example the updated operated state of both assets can include the time of the pairing, the date of the pairing, the driver or operator who performed the operation, and the location where the pairing operation occurred.

Once successfully paired, the tractor 410 and the trailer 420 are associated with each other and the dynamic information discovery protocol system treats the tractor 410 and the trailer 420 as a single asset until a subsequent unpairing action occurs.

Figure 5:
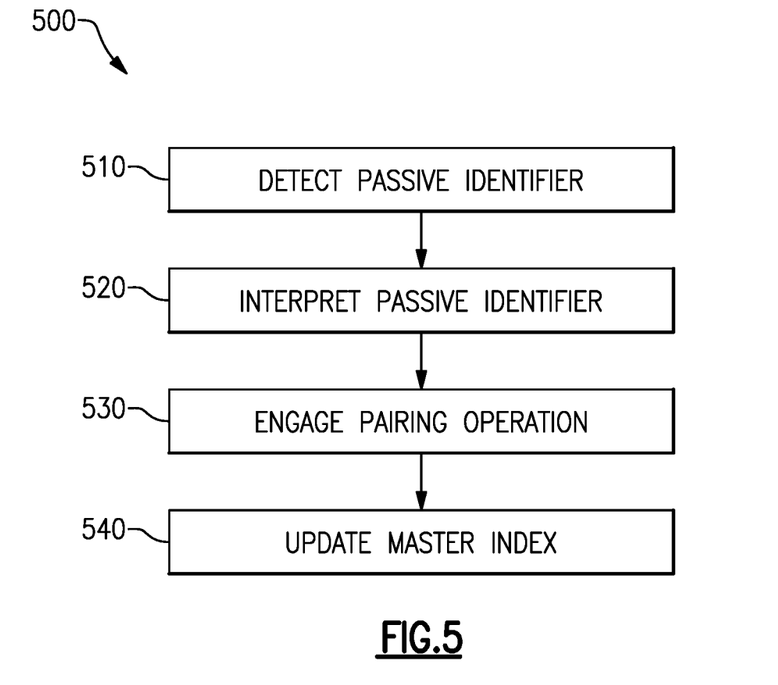
FIG. 5 schematically illustrates a high level method by which the passive discovery pairing process of FIG. 4 is accomplished.

With continued reference to FIG. 4, FIG. 5 illustrates the pairing of FIG. 4 using an exemplary flowchart 500 at a high level of abstraction. Initially an asset instigating the pairing operation (in the example of FIG. 4, the tractor 410) detects the presence of a passive identifier on an asset being paired to the first asset (in this case the plaque 430 on the trailer 420) in a "Detect Passive Identifier" step 510. Once detected, the first asset interprets the passive identifier, as described above, in an "Interpret Passive Identifier" step 520.

Once the information regarding how to interpret the passive identifier has been retrieved and the identifier is interpreted, the first asset engages the pairing operation according to the information contained on the passive identifier and in the corresponding entry of the master asset identifier in an "Engage Pairing Operation" step 530 and updates the master index of the dynamic information discovery protocol for the given environment to indicate that the two assets have been paired to a single asset in an "Update Master Index" step 540.

Figure 6:
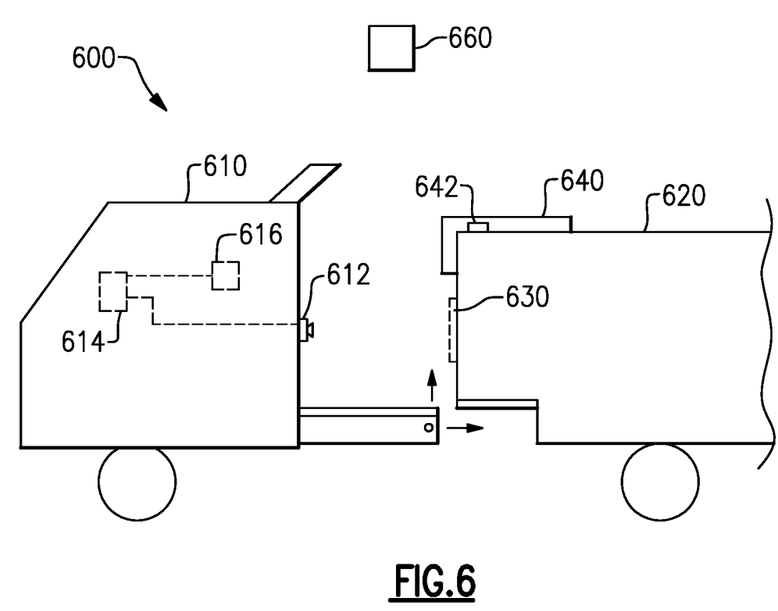
FIG. 6 schematically illustrates an example active discovery pairing system for two assets in a dynamic information discovery protocol.

With reference to both FIGS. 4 and 5, the Figures illustrate a passive pairing procedure in which the data provision from one asset (the trailer 420) is entirely passive on the part of that asset. In alternative examples, active data sharing can be utilized to further facilitate the pairing process. An example system configured to engage in a pairing operation including active data sharing is illustrated in FIG. 6. As with the example of FIGS. 4 and 5 the illustrated assets are a tractor and a trailer, however it is appreciated that the pairing procedure can be extended to, and adapted for, the pairing of any group of assets within a single dynamic information discovery protocol environment.

The activing pairing example 600 of FIG. 6 uses an active sensing-equipped trailer 620 with an active ranging tractor 610. The tractor 610 is configured identically to the tractor 410 of the example illustrated in FIG. 4. The utilization of the active pairing method described below provides comprehensive and reliable control of the hook operation by leveraging the dynamic information discovery protocol to take advantage of the additional capability of the trailer 420 without requiring any additional trailer-specific capability on the tractor 410.

The trailer 420 is equipped with an active transponder 642, provided as a module integrated with an attached refrigeration unit 640. The refrigeration unit 640 supplies electrical power to support the active electronic features of the transponder 642. In alternative examples, the transponder 642 can include an independent dedicated power source, or be connected to any other electrical power supply and need not be integrated into a refrigeration unit 640. In one example, the transponder 642 includes global navigation satellite (GNSS) ego-location fixing technology and bi-directional wide-area and local-area radio communications capabilities, such as an LTE modem, Bluetooth, WiFi, and the like.

To pair the tractor 610 with the trailer 620 a dispatching system 660 of the fleet operator queries the url of the trailer 620 master asset identifier at the time it is assigning the load to a driver (or has the information cached from a recent prior dispatch of the same trailer 620 master asset identifier) and determines that the trailer 620 can support inbound wide-area communications messaging. The dispatching system 660 further determines that the trailer 620 includes active optical ranging technology and the supporting protocols supporting protocols.

Once determined that the trailer 620 supports active pairing (e.g. by including an active ranging system) the logic in the dispatching system 660 sends a message to both the tractor 610 and the trailer 620, providing each the pairing coordinates and calibration parameters of each of the tractor 610 and the trailer 620 to both of the tractor 610 and the trailers 620 using one of the wide area or local area communication protocols.

The trailer 620 acknowledges the message from the dispatch system 660 and updates its operational status to "assigned and un-hooked" in the dynamic information discovery protocol environment. One the status is updated, the trailer 620 sends a message to the tractor 610 (based on the master asset identifier profile) with a current estimated GNSS location of the trailer 620 and the estimated precision of the GNSS location. In addition, the trailer 620 provides a specific Bluetooth broadcast message signature, or other wireless passcode, that it is activating for remote identification from the tractor 610.

The vehicle processing unit 616 of the tractor 610 is also equipped with wide-area radio connectivity and receives the message from the trailer 620. The tractor 610 then displays a local-area map with a wayfinding-based path from its current location to the specific trailer 620 location, thereby allowing the operator of the tractor 610 to find the specific trailer. In alternate examples, any alternate methodology for providing direction to the operator of the tractor 610 can be utilized to the same effect. The tractor 610 also turns on the corresponding wireless network receiver of its connectivity module in the VPU 616 and begins receiving the specific asset identifier encoding proposed by the trailer 620. In addition, the VPU 616 can poll the immediate vicinity for any tertiary assets that may include sensor information that could assist in the pairing operation. If any are found, then the master asset identifiers are exchanged and a data connection between at least the VPU 616 of the tractor 610 and the tertiary asset is established.

The tractor 610 combines the information from the received wireless signal of the trailer 620, any information from tertiary assets, and its own GNSS system to positively identify and direct the operator of the tractor 610 to the specific assigned trailer 620.

When the tractor controller (VPU 616) senses that the two assets (the tractor 610 and the trailer 620) are in sufficiently close proximity, it initiates an active optical rangefinding on both the tractor 610, by sending a message to the VPU 616, and on the trailer 620, by sending a token-authorized message to the trailer 620 url via the dynamic information discovery protocol.

The trailer 620 activates an active optical ranging system 630, such as commonly available focused beam IR LED emitters. One exemplary active optical ranging system 630 provides converging vertical and horizontal ranging envelopes via two emitters for each dimension transmitting within different narrow spectral ranges. Alternative active optical ranging systems can be utilized to similar effect, with the specific optical ranging protocols of the trailer 620 being provided to the tractor 610 via the dynamic information discovery protocol.

The tractor 610 VPU 616 activates one or more rear-facing video cameras 612, and upon querying the dynamic information discovery protocol learns that the next assigned trailer 620 includes an active ranging system 630, activates an image processing algorithm 614 that begins to detect the point sources being transmitted by the optical ranging system 630 of the trailer 620.

When the point sources of the optical ranging system 630 begin to be received in a coherent manner by the VPU 616 of the tractor 610, the VPU 616 transmits a message to the tractor 610 human machine interface indicating that a positive lock with the specific trailer 620 has been achieved. The distance between the point sources of the optical ranging system 630 and the camera 612, as well as the associated spectra, provides a positive signal of relative positioning, range and closing velocity of the tractor 610 and the trailer 620, enabling the VPU 616 to calculate and communicate a traffic light of within-range maneuvering. The human machine interface operates in a similar fashion as the human machine interface described above with regards to FIGS. 4 and 5, thereby facilitating the paring operation.

With continued reference to FIGS. 4, 5 and 6, a similar process can be performed for aligning a trailer 420, 620 with a dock for loading and unloading. In such an example, the dynamic information discovery protocol is used to identify the specific dock or loading bay to pair the combined asset of the tractor 410, 610 and the trailer 420, 620 according to the same process as the pairing between the tractor 610 and the trailer 620 described above regarding FIG. 6. In yet further alternatives, the optical ranging system 630 can be replaced with, or supplemented by, image based object detection systems that utilize existing cameras (e.g. mirror replacement systems) to determine relative object positioning.

Further, it is appreciated that the pairing procedure can be extended to any number or types of assets being paired together within a dynamic information discovery protocol environment, and the pairing is not limited in scope to the hooking or docking procedures enumerated herein.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A method for pairing commercial shipping assets comprising:
   identifying the presence of a second asset using a sensor system of a first asset;
   retrieving a master asset identifier of the second asset using a controller of the first asset;
   physically connecting the first asset and the second asset; and
   updating a dynamic information discovery protocol environment;
   wherein said physically connecting includes receiving a feed from at least one sensor of the second asset at a controller of the first asset and responding to the feed from the at least one sensor of the second asset; and
   wherein said responding to the feed from the at least one sensor of the second asset comprises automatically adjusting a docking assist operation performed by the controller of the first asset.

2. The method of claim 1, wherein identifying the presence of the second asset includes detecting an optically-readable encoded asset identifier using the sensor system of the first asset.

3. The method of claim 2, wherein the optically readable encoded asset identifier includes an encoded universal resource locator identifying a location where the master asset identifier of the second asset can be retrieved.

4. The method of claim 3, wherein retrieving the master asset identifier includes accessing the encoded universal resource locator and downloading the master asset identifier of the second asset.

5. The method of claim 2, wherein the optically readable encoded asset identifier includes at least one of horizontal ranging bars and vertical ranging bars.

6. The method of claim 5, wherein the optically readable encoded asset identifier includes both horizontal ranging bars and vertical ranging bars.

7. The method of claim 1, wherein responding to the feed from the at least one sensor of the second asset comprises providing a notification to an operator of the first asset.

8. The method of claim 1, wherein updating the dynamic information discovery protocol environment comprises associating the first asset and the second asset in the dynamic information discovery protocol such that the first asset and the second asset are defined as a single asset.

9. The method of claim 1, wherein the first asset is a commercial tractor and wherein the second asset is a trailer.

10. The method of claim 1, wherein updating the dynamic information discovery protocol environment includes identifying a time of a pairing, identifying a date of a pairing, identifying an operator who performed the pairing, and identifying a location where the pairing operation occurred.

* * * * *